(No Model.)
H. S. HOWARD.
CORN PLANTER.
No. 319,254. Patented June 2, 1885.
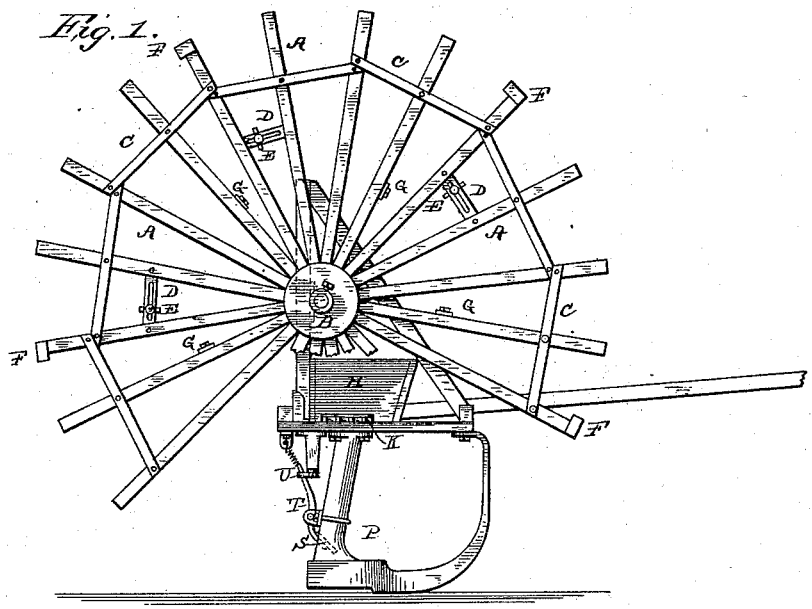
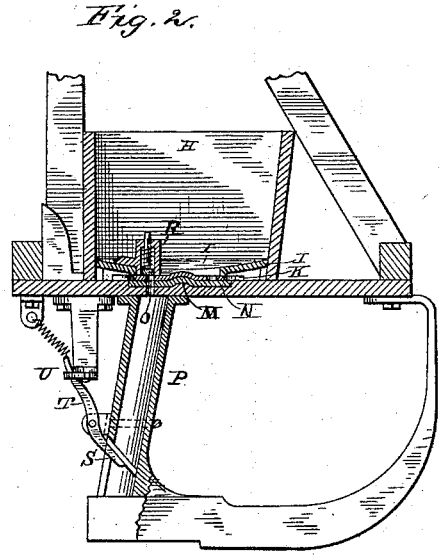
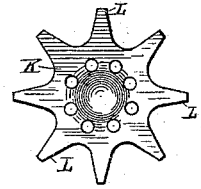
WITNESSES
Chas. D. Davis.
Edwin L. Jewell
INVENTOR
H. S. Howard.
By C. M. Alexander
Attorney

UNITED STATES PATENT OFFICE.

HARLAN S. HOWARD, OF CHARLES CITY, IOWA.

CORN-PLANTER.

SPECIFICATION forming part of Letters Patent No. 319,254, dated June 2, 1885.

Application filed January 24, 1885. (No model.)

*To all whom it may concern:*

Be it known that I, HARLAN S. HOWARD, a citizen of the United States, residing at Charles City, in the county of Floyd and State of Iowa, have invented certain new and useful Improvements in Corn-Planters, of which the following is a specification, reference being had therein to the accompanying drawings.

My invention relates to improvements in corn-planters, and is designed to produce a device combining both a planting and a marking mechanism, said mechanisms being relative and coincident.

The improvement consists, essentially, in the employment of a rimless wheel or wheels as markers, and a peculiar construction of dropping mechanism operated by direct contact with the said wheels.

In describing the device reference is had to the annexed drawings, in which Figure 1 represents an elevation of a portion of a planter containing the improvement; Fig. 2, a section through the hopper and planting mechanism; Fig. 3, a detail showing the slotted lever, and Fig. 4 a bottom view of a perforated plate operating in the bottom of the hopper.

A series of spokes, A, radiate from a hub, B, and are held together by braces C, thereby forming a rimless wheel, one being placed at each end of an axle supporting a frame on which is secured the planting mechanism.

At proper intervals on the wheel are secured slotted plates D, to which are adjustably fastened stop or lugs E. On the end of the spoke following the stop E is an enlargement, F, acting as a marker. On the spoke following the marker is a stop or check, G.

The bottom of the hopper H is covered by a concave plate, I, with a central opening. Beneath this plate rests a perforated plate, K, having radial arms L and a central convexity, in which projects a bulge or convexity, M, on a bearing-plate, N. The bearing-plate N has a perforation, O, which coincides with those in the plate K, and leads to the hollow standard of a plow or opener, P.

Secured so as to rest over one of the perforations in the plate K, when coincident with that in the plate N, is a cut-off, R, which prevents more than a quantity of grain as contained in one of the said perforations of the plate K to pass to the plow-standard.

Within the standard is a valve, S, at the end of a pivoted lever, T, which has a spring retention, and is operated by a slotted lever, U, one end of which engages with the stops G following the marker.

The plate K is turned by contact of its arms with the stops E.

Grain is first delivered to the plow-standard, and then to the ground.

The wheels operate in unison, and may be adjusted up or down by means of any suitable axle-bearings to regulate the depth of planting. The stops are adjustable both longitudinally and perpendicularly to their bearings.

What I claim is—

1. A dropping mechanism consisting of a perforated plate having radial arms and a central convexity, and a bearing-plate with a corresponding convexity, in combination with a supporting wheel or wheels having a series of stops engaging with the radial arms, substantially as and for the purpose specified.

2. A dropping mechanism consisting of a perforated plate having radial arms and a central convexity, a bearing-plate with a corresponding convexity, and a covering-plate concaved toward a central opening, substantially as and for the purpose specified.

3. The combination, with rimless wheels having markers at the ends of the spokes, and also a series of stops, of a dropping mechanism consisting of a perforated plate with a central convexity forming a pivotal bearing therefor, said plate also having a series of radial arms, substantially as and for the purpose specified.

4. The combination, with rimless wheels having series of stops thereon, of a dropping mechanism consisting of a pivoted and perforated plate provided with radial arms, and a planting mechanism consisting of a valve within the hollow standard of an opening-plow, said valve operated by a slotted lever, the parts operating substantially as and for the purpose specified.

5. The combination, with rimless wheels having series of stops on the spokes and at proper intervals markers at the end thereof, of a dropping mechanism consisting of a perforated plate with radial arms and a central convexity, a plate with a perforation and a central bulge or convexity, and a concave plate with a central opening, and a planting mechanism consisting of a hollow standard-plow, said standard provided with a valve at the end of a lever, which is operated by a lever contacting with one of the series of stops on the wheel, substantially as and for the purpose specified.

6. A dropping mechanism consisting of a perforated plate having radial arms and a central convexity, and a bearing-plate with a corresponding convexity, substantially as and for the purpose specified.

In testimony whereof I affix my signature in presence of two witnesses.

HARLAN S. HOWARD.

Witnesses:
H. C. RAYMOND,
W. J. NEILL.